Oct. 28, 1924.

S. LOEWE 1,512,941

FREQUENCY CHANGING DEVICE

Filed March 19, 1921

Inventor:
Siegmund Loewe.
by C. C. Sprague. Att'y.

Patented Oct. 28, 1924.

1,512,941

UNITED STATES PATENT OFFICE.

SIEGMUND LOEWE, OF BERLIN, GERMANY, ASSIGNOR TO WESTERN ELECTRIC COMPANY, INCORPORATED, OF NEW YORK, N. Y., A CORPORATION OF NEW YORK.

FREQUENCY-CHANGING DEVICE.

Application filed March 19, 1921. Serial No. 453,843.

*To all whom it may concern:*

Be it known that I, SIEGMUND LOEWE, a citizen of the German Republic, residing at Berlin, have invented certain new and useful Improvements in Frequency-Changing Devices, of which the following is a full, clear, concise, and exact description.

This invention relates to circuit arrangements, including electronic discharge tubes for changing the frequency of an alternating current. More particularly it relates to a device including a cathode, an anode, and a grid, operated on that part of the grid-current anode-potential curve at which the grid-current shows a decrease for either positive or negative potential applied to the anode.

Figure 1:
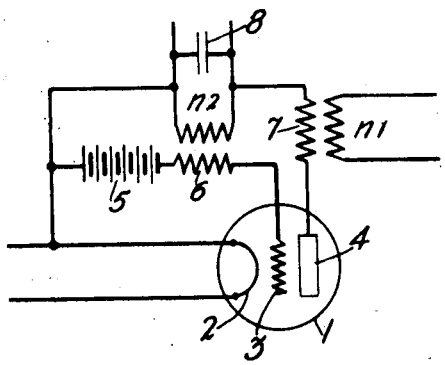
Figure 2:
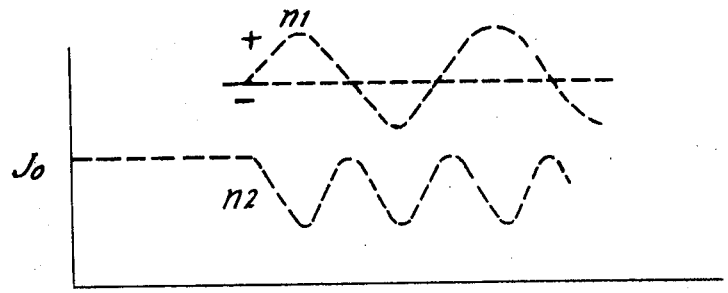

The principle of the invention is more fully exemplified in connection with the accompanying drawings of which Fig. 1 shows a vacuum tube associated with suitable circuits for doubling the frequency, and Figs. 2 and 3 comprise certain curves hereinafter referred to for explaining the invention.

1 is the tube, 2 the incandescent cathode, 3 a grid preferably wide-meshed, 4 any kind of anode. The grid 3 is connected to the cathode by the battery 5 and the primary winding 6 of an output transformer. The anode 4 is connected to the cathode by the secondary winding 7 of a transformer. An auxiliary potential can be supplied in the anode circuit. If necessary the heating battery or battery 5 can be used for this purpose. The increased frequency $n_2$ is obtained from the secondary winding of the transformer 6.

The operation is as follows:

Under the effect of battery 5 a continuous current flows in the circuit 2, 3, 5, 3. This continuous current is not independent of the potential of anode 4. Either a positive or a negative potential of anode 4 causes a fall of current in the system 2, 3, 5, 6. Therefore the alternating positive and negative voltage waves of the current $n_1$ both causes a decrease of the current in the transformer 6. The curve of Fig. 2 represents this action. The dotted line $J_0$ represents the continuous current in the circuit 2, 3, 5, 6. If the potential $n_1$ now begins to act on the anode 4, both the positive and the negative half-wave of this potential will cause a fall in the current $J_0$. The result is the occurrence of a wave current of doubled frequency in the circuit 2, 3, 5, 6; this wave current can be obtained as pure alternating current of doubled frequency by transformation in the secondary winding $n_2$. The presence of battery 5 in the grid circuit is essential to the efficiency and energetic action of the apparatus. The action of the apparatus is better in proportion to the strength with which the potential variations of anode 4 affect the current in system 2, 3, 5, 6. Therefore for the present purpose it is advisable to use tubes having a large amplification.

Figure 3:
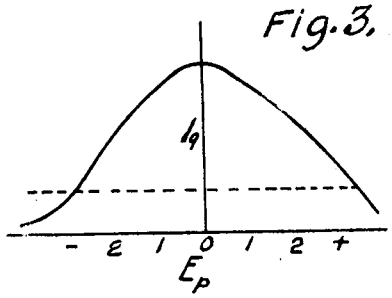

The curve of Fig. 3 is an approximate characteristic curve of the tube 1 showing the change of grid current with change of plate voltage. Values of grid current are represented by ordinates, and plate voltages by abscissæ. The portion of this curve above the dotted line represents the part upon which this system is preferably designed to operate.

The stepping up of the frequency can be repeated many times: the frequency $n_2$ of the potential variations of the anode can be superposed on another tube or even on the tube which has already been used. In the latter case the frequency is repeatedly doubled in the same tube. It is advisable to have the systems $n_1$ and $n_2$ in resonance. System or circuit $n_1$ will be in resonance with the waves applied to the input circuit while $n_2$ will be in resonance with the output waves by tuning it by means of a variable condenser 8 or other suitable means. The great advantage of the arrangement lies in the fact that it is possible not only to increase the frequency, but also to amplify the energy simultaneously. It is evident from Fig. 2 that battery 5 produces additional energy when the frequency is increased.

What is claimed is:

1. A space current device, having a cathode, an anode, and a grid, a source of space current connected between said grid and said cathode, means connected between said anode and said cathode for receiving an incoming wave of potential, and other means connected between said anode and said cathode for transmitting an outgoing wave of twice the frequency of said incoming wave in response to said incoming wave.

2. Means for increasing the frequency of a wave comprising a space current device having a cathode, an anode, and a grid, a source of space current connected between said cathode and said grid, an anode circuit connected between said anode and said cathode, said anode circuit containing means for receiving a wave to be increased in frequency, and an output circuit associated with said anode circuit for conducting away a wave of increased frequency produced by said device in response to a received wave.

3. Means for increasing the frequency of a wave comprising a space current device having a cathode, an anode, and a grid, a source of space current connected between said cathode and said grid, an anode circuit connected between said anode and said cathode, said anode circuit containing means for receiving a wave to be increased in frequency, an output circuit associated with said anode circuit for conducting away a wave of increased frequency produced by said device in response to a received wave, and a condenser in shunt to a portion of said anode circuit for tuning said portion of the anode circuit to resonance with said wave of increased frequency.

4. Means for increasing the frequency of a wave comprising a space current device having a cathode, an anode, and a grid, an anode circuit connected between said anode and said cathode, said anode circuit containing the secondary winding of an input transformer and the secondary winding of an output transformer, an input circuit containing a primary winding for said input transformer, an output circuit associated with said secondary winding of said output transformer, a grid circuit connected between said grid and cathode, said circuit containing a primary winding for said output transformer and a source of space current, the potential of said source being such that both positive and negative potentials impressed between said anode and said cathode cause a reduction in the space current between said grid and cathode, whereby waves impressed upon the input circuit produce waves of increased frequency in said output circuit.

5. A space current device, having an anode, a cathode, and a grid, an anode circuit connected between said anode and cathode, and a grid circuit comprising a source of space current connected between said grid and cathode, an input circuit and an output circuit coupled to said anode circuit, and means associated with said grid circuit for causing a wave impressed upon said input circuit to produce a wave of double frequency in said output circuit.

In witness whereof, I hereunto subscribe my name this ninth day of February, A. D. 1921.

Dr. SIEGMUND LOEWE.